United States Patent
Cordery et al.

(10) Patent No.: US 8,368,924 B2
(45) Date of Patent: Feb. 5, 2013

(54) SYSTEM AND METHOD FOR PRINTING DOCUMENTS HAVING A COPY DETECTION PATTERN

(75) Inventors: Robert A. Cordery, Danbury, CT (US); Bertrand Haas, New Haven, CT (US); Frederick W. Ryan, Jr., Oxford, CT (US); Scott F. Armstrong, Toronto (CA)

(73) Assignee: Pitney Bowes Inc., Stamford, CT (US)

( * ) Notice: Subject to any disclaimer, the term of this patent is extended or adjusted under 35 U.S.C. 154(b) by 597 days.

(21) Appl. No.: 12/330,858

(22) Filed: Dec. 9, 2008

(65) Prior Publication Data

US 2010/0141979 A1 Jun. 10, 2010

(51) Int. Cl.
*G06F 3/12* (2006.01)

(52) U.S. Cl. ........ 358/1.15; 358/1.13; 358/1.1; 382/103

(58) Field of Classification Search .................. 358/1.15, 358/1.13, 1.1; 382/103
See application file for complete search history.

(56) References Cited

U.S. PATENT DOCUMENTS

| | | | | |
|---|---|---|---|---|
| 6,061,448 A * | 5/2000 | Smith et al. | ................... | 380/282 |
| 6,297,891 B1 * | 10/2001 | Kara | .............................. | 358/405 |
| 6,378,070 B1 * | 4/2002 | Chan et al. | ..................... | 713/155 |
| 2003/0011810 A1 * | 1/2003 | Strobel et al. | ................. | 358/1.15 |
| 2003/0068045 A1 * | 4/2003 | Foth | ............................... | 380/270 |
| 2004/0003150 A1 * | 1/2004 | Deguchi | ........................... | 710/62 |
| 2006/0028689 A1 * | 2/2006 | Perry et al. | .................... | 358/3.28 |
| 2008/0148353 A1 * | 6/2008 | Dohi | ................................. | 726/2 |
| 2008/0158588 A1 * | 7/2008 | Haas et al. | ................... | 358/1.15 |

\* cited by examiner

*Primary Examiner* — Benny Q Tieu
*Assistant Examiner* — Martin Mushambo
(74) *Attorney, Agent, or Firm* — Brian A. Lemm; Charles R. Malandra, Jr.; Steven J. Shapiro

(57) ABSTRACT

A method of printing a document includes generating commands in a computing device that include: (i) commands for printing based on document data, and (ii) an identification of a determined portion of the document data that is to be used in generating a printed copy detection pattern. The method further includes sending the printer control commands to an intermediate electronic device that stores a key, generating copy detection pattern data using the determined portion of the document data and the cryptographic key, and generating modified printer control commands that include commands for printing a first document portion based on the document data and a second document portion including the printed copy detection pattern based on the copy detection pattern data. Finally, the modified printer control commands are sent to a printing device. Also, a system is provided for implementing the method.

14 Claims, 3 Drawing Sheets

SYSTEM AND METHOD FOR PRINTING DOCUMENTS HAVING A COPY DETECTION PATTERN

FIELD OF THE INVENTION

The present invention relates to systems and method for preventing and detecting unauthorized copies of documents, and in particular to a system and method of printing documents that include a copy detection pattern used for authenticating documents as original and detecting unauthorized copies.

BACKGROUND OF THE INVENTION

Many valuable documents, such as, without limitation, bank notes, checks, and identification documents, are produced and distributed in paper form. Unfortunately, various technologies are now readily available for making high-quality copies of such documents. For example, there are many image capture systems such as CCD cameras, drum scanners, flatbed scanners and other capture/scanning systems that are readily available and that provide excellent reproduction accuracy and precision. Furthermore, very accurate and precise monochrome and color printing systems are readily available for high quality printing of documents, including documents created with the image capture systems just described. As a result, unauthorized copying and counterfeiting of valuable documents as described above is a serious concern.

Several types of physical document copy detection systems are known. One such copy detection system employs what is known as a copy detection pattern (CDP), which consists of an area, such as a rectangular or other shaped area, filled with pixels of random gray levels that is placed in a particular region of a document reserved for that purpose. For example, it is known to generate a CDP by first encrypting a data stream comprising a raster of an image taken from the document to be protected, such as, without limitation, a bar code, using an encryption key to produce an encrypted raster image data stream (the digital CDP), and then printing the resulting image (the analog CDP) based on the encrypted raster image data stream as part of the document in question. Documents containing CDPs are authenticated by capturing (e.g., scanning) the CDP from the document in question and comparing the captured CDP to the original CDP (which is either stored during the creation process for later use in verification or is regenerated during the verification process using the appropriate key and appropriate data from the document).

Unauthorized copies of documents are typically made by either copying the original document or by scanning and reprinting the original document. Copy detection systems employing CDPs rely on the lossy transformations presented by the physical mechanisms involved with making an unauthorized copy in the manners just described. For example, in a scanning and printing process, even the most technologically advanced hardware systems will introduce some distortion or error into the process. Specifically, in a scanning or similar image capture process, a typical scanner grid is usually not aligned exactly on the printed grid of the scanned document. As a result, the scanning process will usually scan a mix of two to four pixels of the original document thereby mixing the gray levels of those pixels. Printing and copying technologies similarly introduce error. For example, in an ink jet printing system, ink usually spreads from the intended pixel to neighboring pixels, and in a thermal printing process, thermal history and neighbor heat effects typically cause a mixing of gray levels among neighboring pixels.

As noted above, documents containing CDPs are authenticated by comparing the CDP captured from the document to the original, "expected" CDP to determine whether they are sufficiently similar to consider the CDP authentic (typically, a determination is made as to whether a certain level of correlation between the two exists). In the case of an authentic CDP, the CDP will have been printed once (when the document was originally created) and scanned once (during the verification process). These steps will result in a certain expected threshold amount of loss/alteration (as compared to the original, digital CDP) that will be considered tolerable in the verification process. However, in the case of an unauthorized copy, the CDP will have undergone the same printing and scanning steps just described (i.e., when the document was created and during the verification process), but will also have undergone additional scanning and printing or copying steps in between those steps. These additional scanning and printing or copying steps will introduce additional losses/alterations (i.e., more than the expected threshold amount of loss that will be considered tolerable). Thus, if in the verification process a certain minimum level of correlation between the two CDPs is detected (corresponding to less than or equal to the threshold loss/alteration just described), then the CDP will be considered to be authentic, and if less than the minimum level of correlation between the two CDPs is detected (corresponding to more than the threshold loss/alteration just described), then the CDP will be considered to be an unauthorized copy.

One problem that exists with current systems that employ CDPs is that when a computer system prints a document with a CDP using an off-the-shelf printer, as is often the case, a user on the computer system has the opportunity to capture the print stream and reprint the document with the CDP. Another problem is that the key used to generate the CDPs is often exposed on the computer system and therefore subject to being compromised.

SUMMARY OF THE INVENTION

In one embodiment, a method of printing a document having a printed copy detection pattern is provided. The method includes generating printer control commands in a computing device, wherein the printer control commands include: (i) commands for printing based on document data, and (ii) an identification of a determined portion of the document data that is to be used in generating the printed copy detection pattern. The method further includes sending the printer control commands to an intermediate electronic device that stores a cryptographic key, generating in the intermediate electronic device copy detection pattern data using the determined portion of the document data and the cryptographic key, and generating in the intermediate electronic device modified printer control commands. The modified printer control commands include commands for printing a first document portion based on the document data and a second document portion including the printed copy detection pattern based on the copy detection pattern data. Finally, the method includes sending the modified printer control commands to a printing device for printing the first document portion and the second document portion.

In another embodiment, a system for printing a document having a printed copy detection pattern is provided that includes a computing device, an intermediate electronic device operatively coupled to the computing device through a first communications channel, wherein the intermediate electronic device stores a cryptographic key, and a printing device operatively coupled to the intermediate electronic device through a second communications channel. The computing device is adapted to generate printer control commands and send the printer control commands to the intermediate electronic device over the first communications channel. The printer control commands include: (i) commands for printing based on document data, and (ii) an identification of a determined portion of the document data that is to be used in generating the printed copy detection pattern. In addition, the intermediate electronic device is adapted to: (i) generate copy detection pattern data using the determined portion of the document data and the cryptographic key, (ii) generate modified printer control commands including commands for printing a first document portion based on the document data and a second document portion including the printed copy detection pattern based on the copy detection pattern data, and (iii) send the modified printer control commands to the printing device over the second communications channel for printing the first document portion and the second document portion.

The printer control commands and the modified printer control commands may be printer control language (PCL) commands. The computing device may be a personal computer (PC) and the intermediate electronic device is preferably a secure electronic device having a secure key store for securely storing the cryptographic key. The computing device may be operatively coupled to the intermediate electronic device through a USB channel. Also, the determined portion of the document data is preferably image data and the copy detection pattern data is preferably the image data encrypted using the cryptographic key. The image data may be a raster image, also referred to as a bitmap, representing a barcode, such as a two dimensional barcode.

Therefore, it should now be apparent that the invention substantially achieves all the above aspects and advantages. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

BRIEF DESCRIPTION OF THE DRAWINGS

The accompanying drawings illustrate presently preferred embodiments of the invention, and together with the general description given above and the detailed description given below, serve to explain the principles of the invention. As shown throughout the drawings, like reference numerals designate like or corresponding parts.

DESCRIPTION OF THE PREFERRED EMBODIMENTS

Figure 1:
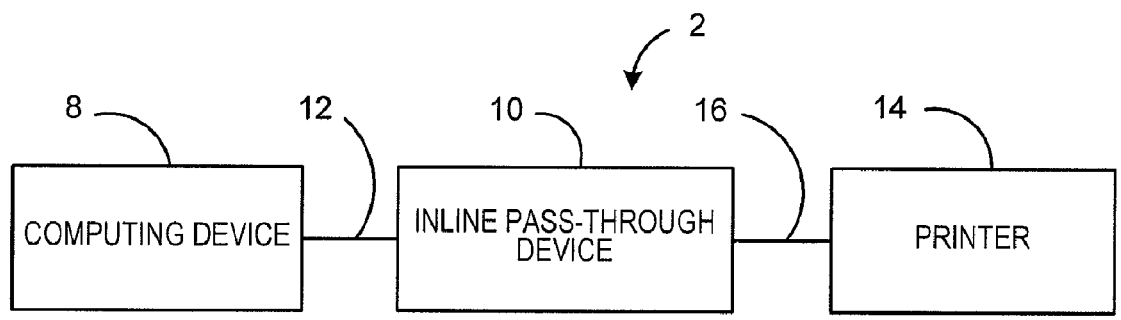
FIG. 1 is a block diagram of a system for printing documents that include a copy detection pattern (CDP) according to one embodiment of the present invention.
Figure 4:
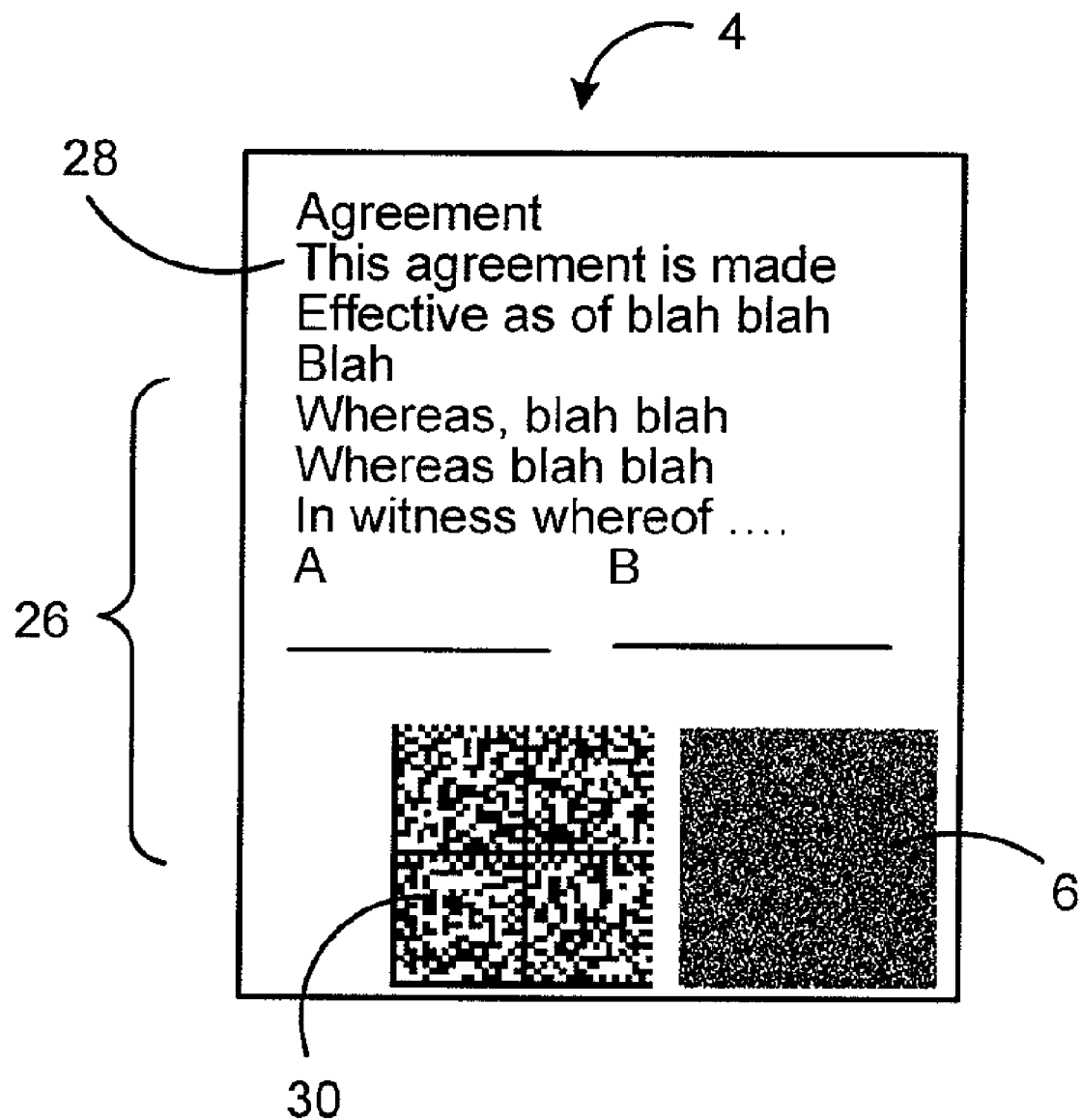
FIG. 4 is a schematic representation of an exemplary document including an exemplary CDP that may be printed using the system of FIG. 1.

FIG. 1 is a block diagram of a system 2 for printing documents, such as the exemplary document 4 shown in FIG. 4, that include a copy detection pattern (CDP), such as the exemplary CDP 6 shown in FIG. 4, according to one embodiment of the present invention. As seen in FIG. 1, the system 2 includes a computing device 8, such as, without limitation, a PC or another suitable device, that is operatively coupled to a secure inline pass-through device 10, described in greater detail below, through a first communications channel 12, such as, without limitation, a USB channel. The inline pass-through device 10 is operatively coupled to a standard printer 14, such as, without limitation, a standard ink-jet or laser printer, through a second communications channel 16, such as, without limitation, a USB channel.

Figure 2:
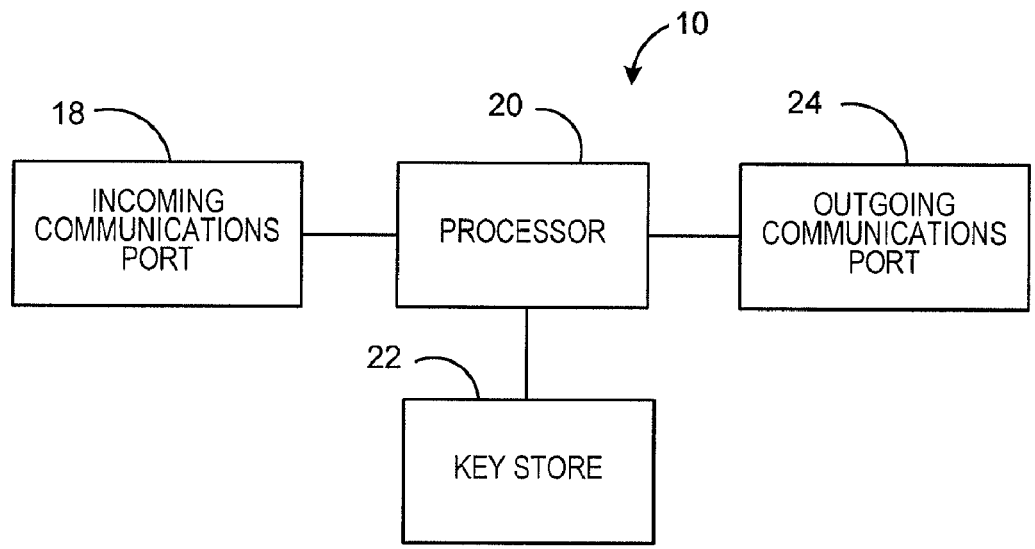
FIG. 2 is a block diagram of the inline pass-through device of the system of FIG. 1 according to one particular embodiment.

FIG. 2 is a block diagram of the inline pass-through device 10 according to one particular embodiment which, as described in greater detail herein, generates the CDPs, such as the exemplary CDP 6 shown in FIG. 4, that are to be printed on documents, such as the exemplary document 4 shown in FIG. 4. The inline pass-through device 10 includes an incoming communications port 18 for receiving commands (described in greater detail elsewhere herein) from the computing device 8 over the communications channel 12. The incoming communications port 18 is operatively coupled to a processor 20, such as, without limitation, a microprocessor, a microcontroller or some other suitable processing device. The processor 20 is operatively coupled to a secure key store 22 which stores one or more cryptographic keys which are used by the processor 20 to generate CDPs. The cryptographic keys could be as simple as a password, or as complex as desired. In particular, the processor 20 is adapted (e.g., by executing suitable stored software routines) to generate a CDP by applying a selected cryptographic algorithm to certain specified document data. The cryptographic algorithm can be a keyed pseudo-random number generator based on a Linear Feedback Shift Register (LFSR), a keyed hash (e.g., SHA-2 with a key) or a symmetric cryptographic algorithm such as DES or AES. In the preferred embodiment, the processor 20 is adapted to generate a CDP by encrypting an image data stream comprising a raster image to produce an encrypted data stream comprising an encrypted raster image such that when the encrypted raster image is printed it produces the CDP in the form of a pseudorandom image. In addition, the processor 20 is operatively coupled to the outgoing communications port 24 which in turn is operatively coupled to the communications channel 16. As described in greater detail elsewhere herein, the processor 20 is adapted to generate and send to the printer 14 commands for printing documents including CDPs.

The inline pass-through device 10 may be made secure using any of a number of known techniques for protecting the security of the keys stored therein. For example, one or more tamper prevention mechanisms may be employed in the inline pass-through device 10 to protect the device, and thus the keys stored therein, from an attacker.

Figure 3:
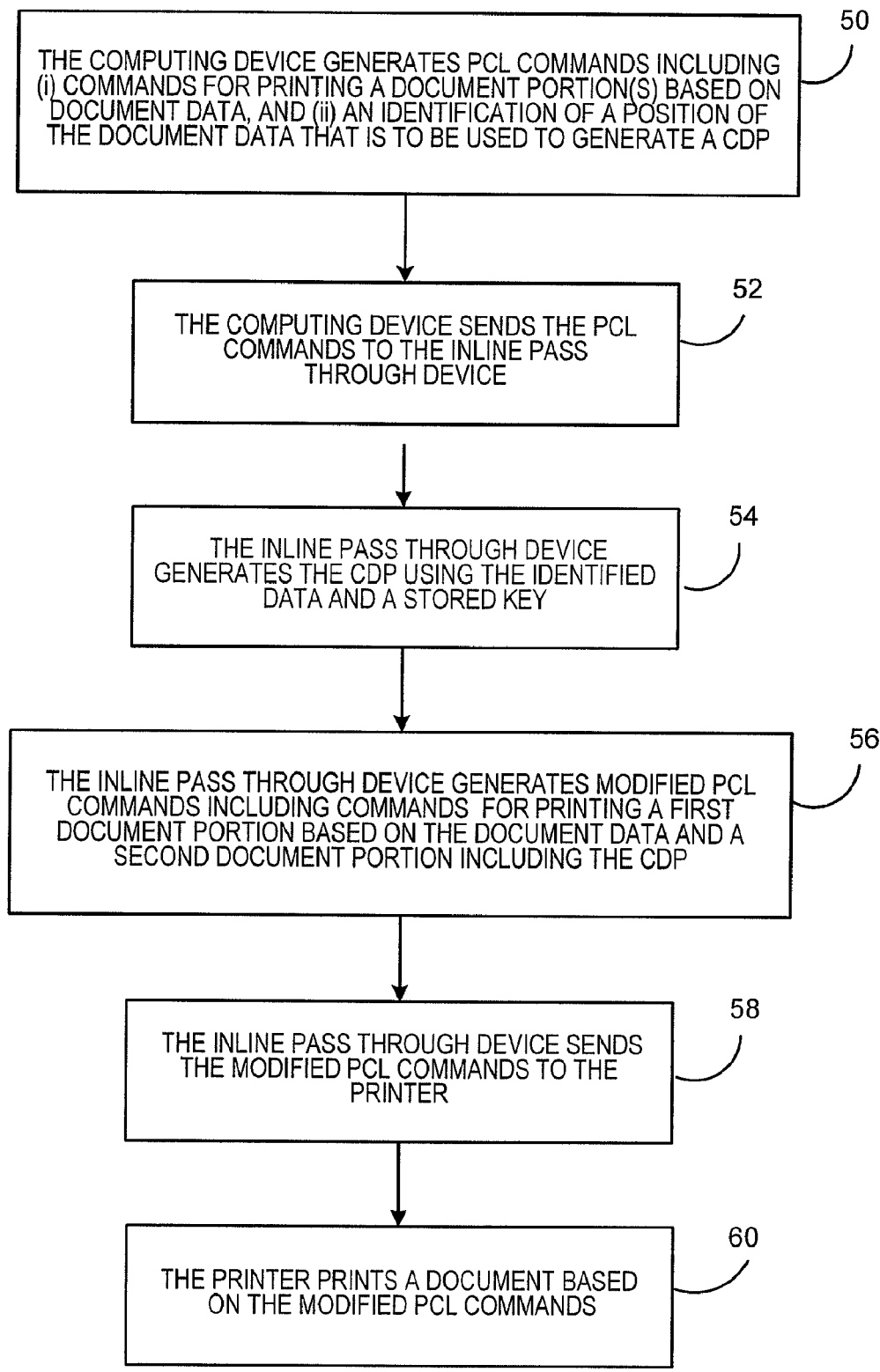
FIG. 3 is a flowchart illustrating a method of printing a document including a CDP using the system of FIG. 1 according to one embodiment of the invention.

FIG. 3 is a flowchart illustrating a method of printing a document including a CDP using the system 2 according to one embodiment of the invention. The method begins at step 50, where the computing device 8 generates commands, preferably in the form of printer control language (PCL) commands, for printing a document, such as the document 4 shown in FIG. 4. The PCL commands may be, for example, as described in the "PCL5 Printer Language Technical Reference Manual" published by Hewlett Packard. Other types of commands, e.g., Postcript, or any other format, may also be utilized. The PCL commands include: (i) commands for printing one or more document portions based on certain document data, such as the document data 26 including text 28 and an image 30 in the form of a two dimensional barcode shown in FIG. 4, and (ii) an identification of a portion of the plaintext document data, which may be, for example, a portion of the image 30, a portion of the text 28, or other data that is to be used to generate a CDP. At step 52, the computing device 8 sends the generated commands to the inline pass-through device 10 through the communications channel 12. Next, at step 54, the inline pass-through device 10 generates the CDP using the identified document data and one of the keys stored in the key store 22. Specifically, upon receiving the commands from the computing device 8 through the incoming communications port 18, the processor 20 parses the commands and isolates the identified document data, obtains the key from the key store 22, and uses the key to encrypt the document data. In the preferred embodiment, the identified document data is the image 30, and in particular the data stream comprising the raster for the image 30. Thus, in the preferred embodiment, step 54 will result in an encrypted raster image which is the digital form of the CDP (i.e., copy detection pattern data).

Next, at step 56, the inline pass-through device 10 generates modified commands, preferably in the form of modified PCL commands, including commands for printing a first document portion based on the document data (e.g., the document data 26 in FIG. 4) and a second document portion including the CDP (e.g., the CDP 6 shown in FIG. 4). Then, at step 58, inline pass-through device 10 sends the modified commands to the printer 14 through the outgoing communications port 24 and the second communications channel 16. Upon receiving the modified commands, the printer 14 at step 60 prints a document as specified in the modified commands, such as the document 4 shown in FIG. 4 that includes the document data 26 and the printed CDP 6.

Thus, in the system 2 and using the method of FIG. 3, a CDP is able to be securely generated inline and the printer commands that include the CDP data are never present on the computing device 8. In addition, as the encryption key used to produce the CDP is protected in the inline pass-through device 10, the presence of the printed CDP on the document proves that the inline pass-through device 10 was present in between the computing device 8 and the printer 14 when the document was printed.

Optionally, additional security measures could also be provided to ensure that only an authorized inline pass-through device 10 is used to generate a CDP. For example, the computing device 8 (or other authority that is authorizing the document to be printed) can provide a digital signature of the document data using a private key associated with the computing device 8 or other authority. The inline pass-through device 10 would then verify the signature using the corresponding public key that is previously stored in the device 10. Optionally, the generation of a CDP can be restricted to just a single device (or some other defined number) by using a key to sign the document data that is known to only those devices 10 that will be authorized to generate the CDP. As another security measure, the computing device 8 or other authority can generate a symmetric key message authentication code (MAC) for the document data that is used to generate the CDP and the inline pass-through device 10 can verify the MAC using its copy of the symmetric key.

While preferred embodiments of the invention have been described and illustrated above, it should be understood that these are exemplary of the invention and are not to be considered as limiting. Additions, deletions, substitutions, and other modifications can be made without departing from the spirit or scope of the present invention. Accordingly, the invention is not to be considered as limited by the foregoing description but is only limited by the scope of the appended claims.

What is claimed is:

1. A method of printing a document having a printed copy detection pattern, comprising:
receiving at an intermediate electronic device printer control commands from a computing device, said printer control commands including: (i) commands for printing based on document data, and (ii) an identification of a determined portion of the document data that is to be used in generating said printed copy detection pattern;
generating in said intermediate electronic device copy detection pattern data using said determined portion of the document data and a cryptographic key stored in the intermediate electronic device;
generating in said intermediate electronic device modified printer control commands, said modified printer control commands including commands for printing a first document portion based on the document data and a second document portion including said printed copy detection pattern based on said copy detection pattern data; and
sending said modified printer control commands to a printing device for printing said first document portion and said second document portion.

2. The method according to claim 1, wherein said printer control commands and said modified printer control commands are PCL commands.

3. The method according to claim 1, wherein said computing device is a PC and wherein said intermediate electronic device is a secure electronic device having a secure key store for securely storing said cryptographic key.

4. The method according to claim 1, wherein said computing device is operatively coupled to said intermediate electronic device through a USB channel.

5. The method according to claim 1, wherein said determined portion of the document data is image data and wherein said copy detection pattern data comprises said image data encrypted using said cryptographic key.

6. The method according to claim 5, wherein said image data is a raster image.

7. The method according to claim 5, wherein said image data represents a barcode.

8. A system for printing a document having a printed copy detection pattern, comprising:
a computing device;
an intermediate electronic device operatively coupled to said computing device through a first communications channel, said intermediate electronic device storing a cryptographic key;
a printing device operatively coupled to said intermediate electronic device through a second communications channel;
wherein said computing device is adapted to generate printer control commands and send said printer control commands to said intermediate electronic device over said first communications channel, said printer control commands including: (i) commands for printing based on document data, and (ii) an identification of a determined portion of the document data that is to be used in generating said printed copy detection pattern; and
wherein said intermediate electronic device is adapted to: (i) generate copy detection pattern data using said determined portion of the document data and said cryptographic key, (ii) generate modified printer control commands, said modified printer control commands including commands for printing a first document portion based on the document data and a second document portion including said printed copy detection pattern based on said copy detection pattern data, and (iii) send said modified printer control commands to said printing device over said second communications channel for printing said first document portion and said second document portion.

9. The system according to claim 8, wherein said printer control commands and said modified printer control commands are PCL commands.

10. The system according to claim 8, wherein said computing device is a PC and wherein said intermediate electronic device is a secure electronic device having a secure key store for securely storing said cryptographic key.

11. The system according to claim 8, wherein said first communications channel is a USB channel.

12. The system according to claim 8, wherein said determined portion of the document data is image data and wherein said copy detection pattern data comprises said image data encrypted using said cryptographic key.

13. The system according to claim 12, wherein said image data is a raster image.

14. The system according to claim 12, wherein said image data represents a barcode.

* * * * *